United States Patent [19]
Lucas et al.

[11] Patent Number: 5,967,211
[45] Date of Patent: Oct. 19, 1999

[54] TIRE TREAD FOR ICE TRACTION

[75] Inventors: Danielle Lucas, Stow, Ohio; Giorgio Agostini, Colmer-Berg; Filomeno Gennaro Corvasce, Mertzig, both of Luxembourg; James Oral Hunt, Akron, Ohio; Olivier Louis, Arlon, Belgium

[73] Assignee: The Goodyear Tire & Rubber Company, Akron, Ohio

[21] Appl. No.: 08/937,085

[22] Filed: Sep. 24, 1997

[51] Int. Cl.[6] ..................................................... B60C 01/00
[52] U.S. Cl. .......................................................... 152/209.4
[58] Field of Search ........................................... 152/209.4

[56] References Cited

U.S. PATENT DOCUMENTS

| | | | |
|---|---|---|---|
| 3,802,478 | 4/1974 | Boustany et al. | 152/357 |
| 5,447,971 | 9/1995 | Bergh et al. | 523/213 |

FOREIGN PATENT DOCUMENTS

| | | |
|---|---|---|
| D16714 | 2/1956 | Germany . |
| 62-143707 | 12/1985 | Japan . |

*Primary Examiner*—Francis J. Lorin
*Attorney, Agent, or Firm*—Henry C Young, Jr.

[57] ABSTRACT

This invention relates to a tire with a rubber tread reinforced with silica and containing one or more additives designed to aid ice traction for the tread. Such additive is selected from at least one of (i) at least one organic fiber having hydroxyl groups on the surface thereof selected from cellulose fibers and wood fibers and (ii) small, hollow, spherical ceramic particles having silanol groups on the surface thereof. The rubber is composed of at least one or more diene-based sulfur vulcanizable elastomers having a Tg of less than −30° C. and containing silica as predominant particulate reinforcement and other traditional rubber compound ingredients. In particular, a coupler is used to couple the silica as well as the said additive(s) to the elastomer(s) in the tire tread composition.

36 Claims, No Drawings

TIRE TREAD FOR ICE TRACTION

FIELD

This invention relates to a tire having a tread containing silica reinforcement and composed of one or more diene-based sulfur vulcanizable elastomers having a Tg below −30° C., together with at least one additive designed to enhance ice traction for the tire tread and together with a coupler for coupling the silica and the additive to the elastomer(s) of the tire tread.

BACKGROUND

In some countries with relatively harsh, long winters, such as for example some parts of some Scandinavian countries, studded winter tires are used relatively extensively to enhance tire tread traction on icy roads. However, the use of studded tires, namely tire treads containing metallic studs, have sometimes been somewhat restricted at least in part due to potential damage to roads.

For many years, non-studded winter tires have been used which have tread rubber compositions composed of elastomers which have low glass transition temperatures (Tg's), namely Tg's below −30° C. Such low Tg elastomers are typically used to inhibit or at least reduce excessive hardening of the tread rubber composition at the very low ambient operating temperatures.

Also, silica reinforcement of selected elastomers have been used for tire treads intended for winter conditions. For example, see U.S. Pat. No. 5,616,639.

Other winter tread rubber compositions designed to improve tire traction on ice include the aforesaid use of low Tg rubbers, as well as use of low temperature plasticizers designed to provide a general reduction of the tread composition's hardness at low temperatures.

However, it is considered herein that it is still desired to provide tire treads with enhanced traction on roads which are icy for extended periods of time.

Historically, substantial amounts of silica reinforcement in combination with a silica coupling agent has sometimes been used as a primary or predominant reinforcement for various rubber blends in rubber tire treads. For example, see U.S. Pat. Nos. 4,519,430; 5,066,721; 5,227,425 and 5,616,639. Use of various coupling agents to achieve reinforcement of the rubber composition by coupling the silica to the elastomer(s) is well known. However, it is considered herein that such silica/coupler reinforcement is often not, by itself, entirely sufficient for suitably enhanced ice traction for a tire tread.

While it is understood that cellulose fibers have been previously suggested for use in earthmover tire treads to reduce cut propagation in the tire tread rubber composition and that resorcinol/formaldehyde type bonding systems have sometimes been used to bond such fibers to the resin network of the tread rubber composition compounds, it is considered herein that the subject of ice traction for such tread compositions has not been addressed.

In the description of this invention, the terms "rubber" and "elastomer" where used herein unless otherwise prescribed, are used interchangeably. The terms rubber "composition" or "compound" where used herein, unless otherwise prescribed, generally refers to a composition in which one or several rubbers are blended or mixed with various ingredients or materials. A term "compounding ingredient" where used herein unless otherwise prescribed, generally refers to ingredients used to prepare rubber compositions, or compounds. Such terms are well known to those having skill in the rubber mixing and compounding art.

The term "phr", where used herein and according to conventional practice, refers to parts by weight of respective material per 100 parts by weight of rubber.

The Tg of a rubber or rubber compound, as used herein unless otherwise prescribed, refers to its glass transition temperature which can be conventionally be determined, for example, by differential scanning calorimetrie at a heating rate of 10° C. per minute. It is understood that such Tg determination is well known to those having skill in such art.

Summary and Practice of the Invention

In accordance with this invention, a pneumatic tire is provided having a tread of a rubber composition characterized by having a Shore A hardness within a range of about 45 to about 65, preferably about 50 to about 60, and by being comprised of, based on 100 parts by weight rubber of (a) about 95 to 100 phr of at least one diene-based elastomer having a Tg below −30° C. and, correspondingly, zero to about 5 phr of at least one diene-based elastomer having a Tg of −30° C. or above, typically −30° C. to −10° C.; (b) about 30 to about 110, alternatively about 50 to about 100, phr of reinforcing filler selected from (i) precipitated silica containing silanol groups on the surface thereof and (ii) carbon black, wherein said reinforcing filler is composed of from about 10 to about 107, alternatively about 30 to about 97, phr of said silica and about 3 to about 20 phr of carbon black; (c) about 2 to about 30, alternatively about 5 to about 25, phr of at least one additive selected from (i) at least one organic fiber having hydroxyl groups on the surface thereof selected from cellulose fibers and wood fibers, and (ii) hollow, spherical, ceramic particles having silanol groups on the surface thereof; (d) at least one coupler, or coupling agent, having a moiety reactive with the silanol groups on said silica and said ceramic particles and with the hydroxyl groups on said cellulose and/or wood fibers and another moiety interactive with at least one of said diene-based elastomer(s).

In practice, it is usually desired that a weight ratio of said coupler to silica plus said additive(s) of about 1/8 to about 1/20 is used, although such ratio may vary considerably depending somewhat upon the additive selected for use and the concentration of silanol or hydroxyl groups on the surface thereof or otherwise available to react, as the case may be.

In practice, it is required that the tire tread rubber composition, in its sulfur cured condition, have a Shore A hardness within the recited range for enhancing ice traction. While it is to be appreciated that the Shore A hardness is determined at about room temperature (i.e.: about 23° C.), a rather low range of Shore A hardness values is desired, which is indicative of a relatively softer, vulcanized, tread rubber composition. The Shore A hardness value determination is well known to those having skill in such art.

In one aspect of the invention, the organic fibers can be cellulose fibers. In another aspect, the organic fibers can be wood fibers which are a form of cellulose fibers which also contains lignins. In the description of this invention the term "cellulose fibers" is intended to exclude "wood fibers" even though wood fibers are a relatively impure form of cellulose and are physically of a smaller aspect ratio characteristic.

In a further aspect, the substantially spherical, hollow particles are contemplated as being of an aluminosilicate glass composition.

For the purposes of this invention, the cellulose fibers desirably have an average fiber length of about 50 to about 5000 microns, preferably about 100 to about 2000 microns, and an average aspect ratio (length to diameter ratio) of about 5/1 to about 200/1, preferably about 10/1 to about 100/1. The wood fibers for the purposes of this invention are substantially stubbier than the cellulose fibers with an average aspect ratio of about 2/1 to about 50/1, preferably about 3/1 to about 20/1, and an average fiber length of about 20 to about 2500, preferably about 50 to about 1500, microns.

The hollow ceramic particles desirably have an average diameter in a range of about 30 to about 500, preferably about 30 to about 150, microns.

The combination of the particulate, precipitated silica and said additive(s) together with the chemical bonding of such materials to the low Tg elastomer(s) by a coupling agent in a tire tread rubber composition is considered to be novel and a significant departure from past practice. Indeed, this combination of features for a tire tread is considered an important aspect of the invention designed to enhance the ice traction for a tire tread.

It is considered, for example, that a silane unit of an alkoxy silane based coupling agent reacts with the hydroxyl groups on the surface of the cellulose or wood fibers or the silanol groups of the hollow, spherical ceramic particles as well as the silanol groups on the surface of the silica particles, during the thermal mechanical mixing of the rubber composition while compounding ingredients are being mixed with the rubber.

It is considered herein that an additional moiety of the coupling agent, such as for example a polysulfide bridge contained in the coupling agent, reacts with the diene-based elastomer(s) during the processing and curing of the rubber composition, and thereby coupling the silica and the said fibers and/or ceramic particles to the elastomer(s) of the rubber composition of the tread compound.

Such coupling reaction for silica particles is known to be important for the effective reinforcement of rubber compositions for use in tire treads.

In this invention, it is considered that the aforesaid coupling reaction between the said fibers and/or ceramic particles, as the case may be, is important to enhance the tire tread's ice traction by tending to chemically anchor and bond such additives in the tire tread rubber composition.

In practice and in one aspect of the invention, it is believed that the said spherical particles and fibrous additives work by increasing the effective surface of the tire tread that contacts the ice, such as for example, by the friction of the tire tread on the road surface causing the rubber to abrade away and partially expose the said incorporated additives, resulting in an increased surface of the tire tread compared to a smooth tread surface without such additives. After running the tires on the road, a visual observation of the tire tread surface may show numerous fibers and/or spherical particles, as the case may be, somewhat anchored in the surface which are partially exposed. It is acknowledged that, as the spherical particles may be abraded against a road surface as the tire is run on a road, a portion of the particles may have their spherical shape become modified, or fractured or otherwise broken, so that they do not remain in a spherical shape during use. However, such particles may still be referred to herein as spherical particles. Additionally when such fibers or ceramic particles are removed by the friction of the tire on the road, the tire's exposed surface is significantly rougher than that of a tire tread without such additives contained in the tire tread rubber composition. It is readily apparent that a rougher tread surface has a larger surface area for contact with the ice than a smoothly worn traditional tread surface. This is a hypothesis as how improved, or at least enhanced, icy road traction might be obtained for the tire tread.

In the practice of this invention, it is considered important that the elastomers for the tire tread rubber composition have a Tg below −30° C. A purpose in restricting the elastomers to those having a Tg below −30° C. is to inhibit, or avoid, excess tread rubber composition hardening at very low ambient temperature operating conditions.

Representative elastomers for use in this invention include, for example and so long as they have a Tg of less than −30° C. are, for example, high cis 1,4-polybutadiene containing at least 92 percent cis 1,4-structure, medium cis 1,4-polybutadiene having about 35 to about 45, usually about 42, percent cis 1,4-structure, medium vinyl polybutadiene having about 40 to about 70 percent vinyl 1,2-content and a Tg in a range of about −30° C. to about −60° C., cis 1,4-polyisoprene which may be natural rubber, isoprene/butadiene copolymers, styrene/butadiene copolymers, styrene/isoprene copolymers and styrene/isoprene/butadiene terpolymers. It is recognized that one or more of such elastomers may also have variations which exhibit Tg's at or above −30° C., however, it is an important aspect of this invention that only the variations of such elastomers which have Tg's lower than −30° C. are selected. Thus, elastomers such as 3,4-polyisoprene, emulsion polymerization prepared styrene/butadiene copolymer elastomers containing at least about 40 percent units derived from styrene, and high vinyl polybutadiene elastomers containing greater than 70 percent 1,2-vinyl groups, to the extent that such elastomers Tg's are above −30° C., are intended to be excluded from use in the tire treads for this invention.

While elastomers exclusively having Tg's below −30° C. are prescribed, it is contemplated, for the practice of this invention that up to about five weight percent of other elastomers, including elastomers listed above, might be included in the rubber composition, some of which might have a Tg of −30° C. or above, although this is not the preferred rubber composition for this invention.

The cellulose fibers for the purposes of this invention, are a chemically refined product and, thus, intended to be differentiated from wood fibers. Wood fibers, which may chemically be a form of cellulose, are not generally so highly refined and, as hereinbefore discussed, are a relatively impure cellulose fiber in a sense that they also contain lignines and other organic substances as is well known to those skilled in such art. The cellulose fibers might be prepared by various processes such as, for example, grinding or hammer milling wood or wood chips to yield a fibrous wood pulp and subsequently chemically refining the wood pulps to produce a pulp that is fibrous in nature but with the lignin removed. Representative examples of cellulose fibers are sometimes referred to according to their source such as, for example, as leafwood cellulose, soft wood and hard wood cellulose.

The wood and cellulose fiber descriptions presented above are simply intended to be illustrative and are not intended to be otherwise limiting.

The cellulose fibers may have a purity of about 90% to about 100%. It is to be appreciated that the wood fibers are considered herein to be a somewhat less pure version of cellulose fibers and in a sense that they contain lignins, as well as other organic substances, in addition to the cellulose.

Various cellulose fibers may be those such as, for example, Arbocel® of various grades from the Rettenmaier company exemplary of which is, for instance, Arbocel®

B400. Various wood fibers may be those such as, for example, Lignocel® of various grades from the Rettenmaier company exemplary of which is, for instance, Lignocel® HB120.

The hollow, substantially spherical, ceramic particles are composed an aluminosilicate glass composition. A representative example of such particles are ceramic microspheres which are sometimes called "cenospheres". Such materials may be obtained, for example, Tecfil of various grades from the Filtec Ltd company in Great Britain exemplary of which are, for instance, Tecfil T85LD and Tecfil 125.

The hollow spherical ceramic particles for use in this invention, as hereinbefore discussed, may be characterized by having an average particle size of about 30 to about 500 microns, preferably about 30 to about 150, microns. The wall thickness of the hollow spherical particles is variable which may lead to an apparent specific gravity in a range of about 0.7 to about 1.1.

Numerous coupling agents taught for use in coupling silica and diene-based elastomers may be used in the practice of this invention for coupling both the silica and the said additives to the diene-based elastomer(s) of the tire tread rubber composition. For example, various alkoxy silane based coupling agents recited in the aforesaid enumerated patents might be used which contain a polysulfide bridge such as, for example, bis(trialkoxysilylalkyl) polysulfide having from about 2 to about 8, usually an average of about 2 to about 5, sulfur atoms in the sulfur bridge where such alkyl groups may be selected from, for example, methyl, ethyl and propyl radicals, with the alkoxy groups preferably being selected from methoxy and ethoxy groups. A representative example might be bis(triethoxysilylpropyl) polysulfide.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

The siliceous pigment (silica) may, for example, have an ultimate particle size in a range of 50 to 10,000 angstroms, preferably between 50 and 400 angstroms. The BET surface area of the pigment, as measured using nitrogen gas, is in a range of about 80 to about 300, although more usually in a range of about 100 to about 200, although perhaps even up to about 360, square meters per gram. The BET method of measuring surface area is described in the *Journal of the American Chemical Society*, Volume 60, page 304 (1930).

The silica may typically have a dibutylphthalate (DBP) adsorption value in a range of about 150 to about 350, and usually about 200 to about 300 cubic centimeters per 100 grams.

The silica might have an average ultimate particle size, for example, in a range of about 0.01 to 0.05 micron as determined by the electron microscope, although the silica particles may be even smaller in size.

Various commercially available silicas may be considered for use in this invention such as, for example only and without limitation, silicas commercially available from PPG Industries under the Hi-Sil trademark with designations 210, 243, etc; silicas available from Rhone-Poulenc. such as, for example, Zeosil 1165MP and silicas available from Degussa AG with designations such as, for example, VN2, VN3, BV 3370GR and silicas from J. M Huber company such as, for example, Hubersil 8745.

It is readily understood by those having skill in the art that the rubber composition of the tread rubber would be compounded by methods generally known in the rubber compounding art, such as mixing the various sulfur-vulcanizable constituent diene polymers with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example, silica and silica-carbon black mix. As known to those skilled in the art, depending on the intended use of the sulfur vulcanizable and sulfur vulcanized compounds or tread compounds, the additives mentioned above are selected and commonly used in conventional amounts.

Typical additions of carbon black and silica, for this invention, are hereinbefore set forth. Various carbon blacks, particularly rubber reinforcing blacks might be used. For example, although such examples are not intended to be limitive, are of the ASTM designation type N-299, N-234, N-220, N-134, N-115, and N-110. The selection of the type of carbon black is well within an optimization skill by one having skill in the rubber compounding for tire treads, depending somewhat upon the intended use, purpose and properties for the tire tread. Typical amounts of tackifier resins, if used, comprise about 0.5 to about 10 phr, usually about 1 to about 5 phr. Typical amounts of processing aids comprise about 1 to about 80 phr. Such processing aids can include, for example, aromatic, naphthenic, and/or paraffinic processing oils or plasticizer or medium molecular weight polyesters. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344–346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. An antioxidant may be, for example, of the para-phenylene diamine and/or dihydrotrimethylquinoline type.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization on-set.

In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate the cure and to improve the properties of the vulcanizate. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The selection and amounts of the various compounding ingredients are not considered to be critical for the purposes of this invention, except where they may be especially emphasized elsewhere in this description, and can be adjusted or modified by the practitioner as deemed suitable for the desired tire tread properties.

The tire can be built, shaped, molded and cured by various methods which will be readily apparent to those having skill in such art and the rubber compounded as set forth in the representative examples. The parts and percentages are by weight unless otherwise indicated.

In the following examples, rubber compositions are prepared with materials presented in Tables 1, 2 and 3. The values in the tables for the materials are represented in terms of "phr" which are, for the most part, values rounded off to the nearest whole part.

Rubber composition, or compound, physical properties are also provided in Tables 1, 2 and 3. Such properties include compound stiffness as reflected in its 300 percent modulus, as well as compound hardness as reflected by its Shore A hardness. Such properties are well known to those having skill in such art.

A tire's performance is also reflected in Tables 1, 2 and 3, relating to acceleration and braking on ice is provided in normalized values. Comparative values above 100 represent improved tire performance. Ice acceleration values on artificial or natural ice, are measured by time to accelerate from one set speed to a given higher speed, the starting and ending speed of the test depending on the track used to perform the test (e.g.: length of test lane and available braking space) and the test vehicle used. Ice braking values are determined by measuring the braking distance to bring the vehicle to a complete stop from a given starting speed, with the starting speed, as in the case of the acceleration values, being dependant upon the test track used to perform the test. For comparative acceleration and braking testing of different tire rubber compositions, the test conditions were the same for experimental and control tires.

The rubber compositions, or compounds, were prepared by mixing the ingredients in several sequential non-productive stages (without the sulfur and associated accelerator(s) curatives together with antidegradants) to temperatures of about 165° C. followed by a final productive mixing stage to a temperature of about 105° C. in which the curatives and antidegradants are added. An internal rubber mixer (Banbury type) was used.

The resulting rubber compounds were than extruded to form tread strips which, in turn, were built onto tire carcasses and the resulting assembly vulcanized in a suitable mold at a temperature of about 160° C. to form a tire of size 195/65R15.

EXAMPLE I

Control rubber composition A is a silica reinforced rubber composition. It does not contain wood or cellulose fibers or ceramic spheres. The composition has Shore A hardness and dynamic stiffness (300 percent modulus) properties considered herein to be normally desirable for winter tire tread compositions.

Control rubber composition B is composed of relatively low Tg elastomers reinforced with silica, together with a silica coupler, with hardness and dynamic stiffness values lower than those of Control rubber composition A. Such means to improve ice performance of tires (tire treads) is considered herein to be well known to those having skill in such art. Composition B does not contain any wood or cellulose fibers or ceramic spheres. As is apparent from the data shown in Table 1, the tire with tread of composition B provided a significant improvement of acceleration on ice of almost 18 percent as compared to a tire with a tread of composition A. However, no significant improvement in ice braking was obtained with composition B. Thus, it is considered herein that such classical means of compounding to improve the tire performance on ice, as illustrated by the tread of composition B as compared to composition A, are only able to improve ice acceleration but not ice braking.

Experimental compositions C and D represent modifications of composition B by containing 20 phr of wood or cellulose fibers in place of 20 phr of the silica. Compositions C and D also contained an additional 20 phr of rubber processing oil to maintain a Shore A hardness similar to composition B. It is apparent from the data in Table 1 that the tires with tread compositions which contained the fibers (compounds C and D) provided significant improvements in ice acceleration and braking as compared to a tire with a tread of composition B without the fibers. Therefore, it is concluded herein that the inclusion of the wood or cellulose fibers in place of a portion of the silica improved the ice braking performance of the tires.

Composition E is a modification of composition B by containing 20 phr of hollow ceramic spheres in place of 20 phr of the silica. It is evident that the utilization of the ceramic spheres improved the ice performance of composition E as compared to the Control B without the ceramic spheres.

As is apparent from the ice performance test results of compounds C, D and E as compared to the Control B, partial replacement of the silica filler in the tread rubber composition by either the fibers or the hollow ceramic spheres improved the general ice performance of the tires containing these additives in the tread rubber composition, particularly improved the braking on natural ice.

TABLE 1

| | A (Control) | B (Control) | C (Exp) | D (Exp) | E (Exp) |
|---|---|---|---|---|---|
| Compounded Compositions | | | | | |
| IBR-1 50/50[1] | 32 | 0 | 0 | 0 | 0 |
| IBR-2 30/70[2] | 33 | 0 | 0 | 0 | 0 |
| Oil extended MV-BR*[3] | 0 | 48.1 | 48.1 | 48.1 | 48.1 |
| Oil extended cis-BR[4] | 43.8 | 81.3 | 81.3 | 81.3 | 81.3 |
| Silica[5] | 95 | 85 | 65 | 65 | 65 |
| Wood Fibers[6] | 0 | 0 | 6 | 14 | 0 |
| Cellulose Fibers[7] | 0 | 0 | 14 | 6 | 0 |
| Hollow ceramic spheres[8] | 0 | 0 | 0 | 0 | 20 |
| Coupling agent[9] | 15.2 | 10.2 | 10.2 | 10.2 | 10.2 |
| PEG[10] | 0 | 1 | 1 | 1 | 1 |
| Antidegradants | 3.5 | 3.5 | 3.5 | 3.5 | 3.5 |
| Waxes | 1.5 | 1.5 | 1.5 | 1.5 | 1.5 |
| Rubber processing oil | 42 | 25 | 45 | 45 | 25 |
| Fatty acids | 3 | 3 | 3 | 3 | 3 |

TABLE 1-continued

|  | A (Control) | B (Control) | C (Exp) | D (Exp) | E (Exp) |
| --- | --- | --- | --- | --- | --- |
| Zinc oxide | 2.5 | 2.5 | 2.5 | 2.5 | 2.5 |
| Sulfur | 1.4 | 1.4 | 1.4 | 1.4 | 1.4 |
| Accelerators | 3.9 | 4 | 4.5 | 4.5 | 3.4 |
| Vulcanized Compound Properties | | | | | |
| Modulus 300% | 5.7 | 5.7 | 4.6 | 4.5 | 4.7 |
| Shore A hardness | 58 | 53 | 52 | 49 | 51 |
| Dynamic stiffness at -20° C. | 9.2 | 4.7 | 2.9 | 2.4 | 3.7 |
| Tire Performance on Ice | | Tire Size 195/65R15 | | | |
| Natural Ice Braking | | 100 | 108.4 | 104.7 | 104 |
| Artificial Ice Braking | 99.6 | 100 | 101.6 | 101.2 | 101 |
| Artificial Ice Acceleration | 82.1 | 100 | 102 | 103.9 | 103.3 |

*43.8 phr oil extended rubber corresponds to 35 phr of dry rubber and 8.8 phr of oil
81.3 phr extended rubber corresponds to 65 phr of dry rubber and 16.3 phr of oil 1. IBR-1 is an isoprene/butadiene copolymer rubber containing about 50 percent units derived from isoprene and having a Tg of about −45° C. obtained from The Goodyear Tire & Rubber Company.
2. IBR-2 is an isoprene/butadiene copolymer rubber containing about 30 percent units derived from isoprene and having a Tg of about −85° C. obtained from The Goodyear Tire & Rubber Company.
3. An oil extended medium vinyl polybutadiene rubber having a vinyl content of about 53 percent and a Tg of about −55° C. obtained as BUDENE® 1255 from The Goodyear Tire & Rubber Company.
4. Cis-1,4-polybutadiene rubber having a cis 1,4- content of about 95 percent and a Tg of about −98° C. obtained as BUDENE® 1254 from The Goodyear Tire & Rubber Company. The rubber contained 37.5 phr of rubber processing oil.
5. A silica obtained as Zeosil 1165 MP from Rhone Poulenc.
6. Lignocel® HB120, from the J. Rettenmaier & Sohne GMBH & Co company, is a natural wood fiber which is understood to contain some lignin and wood polyoses and understood to have a fiber length of about 40 to about 120 microns and an average aspect ratio of about 10/1.
7. Arbocel® B400, from the J. Rettenmaier & Sohne GMBH & Co company, is a highly pure cellulose fiber reportedly having a purity of about 95% to 99.5% and understood to have an average fiber length of about 900 microns and an average aspect ratio of about 45/1.
8. Hollow ceramic spheres as Tecfil T85LD from the Filtec Ltd company having an average diameter of about 65 microns.
9. The coupling agent is a bis-3-(triethoxysilylpropyl) tetrasulfide (50% active) commercially available as X50S from Degussa as a 50/50 blend of the tetrasulfide with N330 carbon black (thus, considered 50% active). Technically, the tetrasulfide is believed to be an organosilane polysulfide as a composite, or mixture, having an average number of sulfur atoms in a polysulfide bridge in a range of about 3.5 to about 4 connecting sulfur atoms, although the composite, or mixture, may contain individual organosilane polysulfides with about 2 to about 8 connecting sulfur atoms.
10. Poly(ethylene glycol) as Berox 4000 from the Caldic company having a softening point range (interval) of about 55 to 61° C. and a molecular weight of about 4000.

EXAMPLE II

The following Table 2 represents the Control composition F and an Experimental composition G. The Control composition F is presented without a special additive material included in Experimental composition G. Experimental G composition is similar to Control F composition except that some of the silica is replaced by cellulose and wood fibers.

The wood fibers and cellulose fibers were the same as those used in Example I as were the rubber compounding ingredients, except where noted.

The results confirm the improvement in ice performance of tires containing cellulose and wood fibers as a partial replacement of the silica filler (Experimental composition G) as compared to a similar silica reinforced rubber composition (Control F) without the fibers.

It might be noted that a different combination of elastomers and different concentrations of silica and fibers were used than in the compositions of Example I. This supports an aspect of the invention that the addition of the ice performance enhancing materials is not limited to the elastomer blends and fiber and filler levels of Example I.

TABLE 2

|  | F (Control) | G (Exp) |
| --- | --- | --- |
| Compound Compositions | | |
| Natural rubber | 50 | 50 |
| Oil extended cis-BR* | 62.5 | 62.5 |
| Silica | 95 | 75 |
| Wood fibers | 0 | 6.5 |
| Cellulose fibers | 0 | 10 |
| Coupling agent | 15.2 | 15.2 |
| Antidegradants | 3.5 | 3.5 |
| Waxes | 1.5 | 1.5 |
| Rubber processing oil | 35.3 | 48.3 |
| Sulfur | 1.4 | 1.4 |
| Accelerators | 3.6 | 3.5 |
| Fatty acids | 3 | 3 |
| Zinc oxide | 2.5 | 2.5 |
| Vulcanized Compound Properties | | |
| Modulus 300% | 5.6 | 6.1 |
| Shore A hardness | 59.2 | 58.2 |
| Tire Performance on Ice Testing on Natural Ice | Tire Size 175/70R15 | |
| Acceleration | 100 | 103.9 |
| Braking | 100 | 106.4 |

*62.5 phr oil extended cis 1,4-polybutadiene rubber correspond to 50 phr of dry rubber and 12.5 phr of oil

EXAMPLE III

In the following Table 3, the Control rubber composition H is similar to Control composition B used in Example I.

The recited Experimental rubber compositions I and J are of the same composition as Control rubber composition H except that a small amount of either wood fibers or cellulose fibers are used in addition to a small amount of additional coupling agent. No silica was replaced by the added fibers. Also, no additional rubber processing oil was added which thereby resulted in rubber compositions having higher Shore A hardness values as compared to Control composition H.

The wood fibers and cellulose fibers were those used in the previous Examples as were the compounding ingredients except where noted.

It is readily observed that the tires with treads composed of the Experimental rubber compositions I and J with the fiber additions evidenced very significant improvements in ice acceleration as compared to the tire with tread of the Control rubber composition H.

For ice braking, however, the tire with tread of Experimental composition K containing the wood fiber evidenced a slight reduction in performance and the tire with tread of Experimental composition J containing the cellulose fibers evidenced a significant improvement in performance.

TABLE 3

|  | H (Control) | I (Exp) | J (Exp) |
|---|---|---|---|
| Compound Composition | | | |
| IBR-1 50/50 | 32 | 32 | 32 |
| IBR-2 30/70 | 33 | 33 | 33 |
| Oil extended cis BR | 43.8 | 43.8 | 43.8 |
| Wood fibers | 0 | 6 | 0 |
| Cellulose fibers | 0 | 0 | 6 |
| Silica | 85 | 85 | 85 |
| Coupling agent | 13.6 | 15 | 15 |
| PEG | 1 | 1 | 1 |
| Antidegradants | 2.5 | 2.5 | 2.5 |
| Waxes | 2.5 | 2.5 | 2.5 |
| Rubber processing oil | 41.3 | 41.3 | 41.3 |
| Sulfur | 1.4 | 1.4 | 1.4 |
| Accelerators | 4.1 | 4.1 | 4.1 |
| Fatty acids | 3 | 3 | 3 |
| Zinc oxide | 2.5 | 2.5 | 2.5 |
| Compound Properties | | | |
| Modulus 300% | 6.4 | 6.6 | 6.9 |
| Shore hardness | 56.8 | 61.3 | 62.5 |
| Dynamic stiffness at −20° C. | 8.5 | 11.4 | 10.6 |
| Tire Performance on Ice | | Tire Size 195/65R15 | |
| Artificial ice acceleration | 100 | 117.8 | 125.5 |
| Artificial ice braking | 100 | 97.8 | 107.6 |

*43.8 phr oil extended rubber corresponds to 35 phr of dry rubber and 8.8 phr of oil While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread of a rubber composition characterized by having a Shore A hardness within a range of about 45 to about 65 and by being comprised of, based on 100 parts by weight rubber of (a) about 95 to 100 phr of at least one diene-based elastomer having a Tg below −30° C. and, correspondingly, zero to about 5 phr of at least one additional diene-based elastomer having a Tg of −30° C. or above; (b) about 30 to about 110 phr of reinforcing filler selected from (i) precipitated silica containing silanol groups on the surface thereof and (ii) carbon black, wherein said reinforcing filler is composed of from about 10 to about 107 phr of said silica and about 3 to about 20 phr of carbon black; (c) about 2 to about 30 phr of at least one additive selected from (i) at least one organic fiber having hydroxyl groups on the surface thereof selected from cellulose fibers and wood fibers, and (ii) hollow, spherical, ceramic particles having silanol groups on the surface thereof; (d) at least one coupling agent having a moiety reactive with the silanol groups on said silica and said ceramic particles and with the hydroxyl groups on said cellulose and/or wood fibers and another moiety interactive with at least one of said diene-based elastomer(s).

2. The tire of claim 1 where said silica is characterized by having a BET surface area in a range of about 80 to about 360 square meters per gram and a DBP adsorption value in a range of about 150 to about 350 cubic centimeters per 100 grams.

3. The tire of claim 1 wherein for said tread, said cellulose fibers have an average aspect ratio in a range of about 5/1 to about 200/1, an average length in a range of about 50 to about 5000 microns.

4. The tire of claim 1 wherein for said tread, said wood fibers contain lignin, have an average aspect ratio in a range of about 2/1 to about 50/1 and have an average length in a range of about 20 to 2500 microns.

5. The tire of claim 1 wherein for said tread, said spherical hollow ceramic particles have an average diameter in a range of about 30 to about 500 microns and are of an aluminosilicate composition.

6. The tire of claim 1 wherein for said tread, said cellulose fibers have an average aspect ratio in a range of about 5/1 to about 200/1, an average length in a range of about 50 to about 5000 microns; said wood fibers contain lignin, have an average aspect ratio in a range of about 2/1 to about 50/1 and have an average length in a range of about 20 to 2500 microns; and said spherical hollow ceramic particles have an average diameter in a range of about 30 to about 500 microns and are of an aluminosilicate composition.

7. The pneumatic tire of claim 6 wherein said cellulose fibers are of 90% to about 100% purity by weight.

8. The tire of claim 1 wherein for said tread, said cellulose fibers have an average aspect ratio in a range of about 10/1 to about 100/1, an average length in a range of about 100 to about 2000 microns; said wood fibers contain lignin, have an average aspect ratio in a range of about 3/1 to about 20/1 and have an average length in a range of about 50 to 1500 microns; and said spherical hollow ceramic particles have an average diameter in a range of about 30 to about 150 microns and are of an aluminosilicate composition.

9. The tire of claim 1 wherein for said tread, said diene-based elastomer with Tg below −30° C. is at least one elastomer, so long as it has a Tg below −30° C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene1isoprene/butadiene terpolymers.

10. The tire of claim 2 wherein for said tread, said diene-based elastomer with Tg below −30° C. is at least one elastomer, so long as it has a Tg below −30° C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

11. The tire of claim 3 wherein for said tread, said diene-based elastomer with Tg below −30° C. is at least one elastomer, so long as it has a Tg below −30° C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

12. The tire of claim 4 wherein for said tread, said diene-based elastomer with Tg below −30° C. is at least one elastomer, so long as it has a Tg below −30° C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

13. The tire of claim 5 wherein for said tread, said diene-based elastomer with Tg below −30° C. is at least one elastomer, so long as it has a Tg below −30° C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

14. The tire of claim 6 wherein for said tread, said diene-based elastomer with Tg below −30° C. is at least one elastomer, so long as it has a Tg below −30° C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

15. The tire of claim 7 wherein for said tread, said diene-based elastomer with Tg below −30° C. is at least one elastomer, so long as it has a Tg below −30° C., selected from high cis 1,4-polybutadiene containing at least 92 percent cis–1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

16. The tire of claim 8 wherein for said tread, said diene-based elastomer with Tg below −30° C. is at least one elastomer, so long as it has a Tg below −30° C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

17. The tire of claim 1 where the said coupling agent is a bis-(trialkoxysilylalkyl) polysulfide having from 2 to about 8 connecting sulfur atoms in its sulfur bridge and where the weight ratio of coupling agent to silica plus said additive(s) is in a range of about 1/8 to about 1/20.

18. The tire of claim 6 where the said coupling agent is a bis-(trialkoxysilylalkyl) polysulfide having from 2 to about 8 connecting sulfur atoms in its sulfur bridge and where the weight ratio of coupling agent to silica plus said additive(s) is in a range of about 1/8 to about 1/20.

19. The tire of claim 8 where the said coupling agent is a bis-(trialkoxysilylalkyl) polysulfide having from 2 to about 8 connecting sulfur atoms in its sulfur bridge and where the weight ratio of coupling agent to silica plus said additive(s) is in a range of about 1/8 about 1/20.

20. The tire of claim 9 where the said coupling agent is a bis-(trialkoxysilylalkyl) polysulfide having from 2 to about 8 connecting sulfur atoms in its sulfur bridge and where the weight ratio of coupling agent to silica plus said additive(s) is in a ratio of about 1/8 about 1/20.

21. The tire according to claim 1 wherein said polysulfide is a bis-3-(triethoxysilylpropyl) polysulfide having an average of about 2 to about 5 connecting sulfur atoms in its sulfur bridge.

22. The tire according to claim 2 wherein said polysulfide is a bis-3-(triethoxysilylpropyl) polysulfide having an average of about 2 to about 5 connecting sulfur atoms in its sulfur bridge.

23. The tire according to claim 3 wherein said polysulfide is a bis-3-(triethoxysilylpropyl) polysulfide having an average of about 2 to about 5 connecting sulfur atoms in its sulfur bridge.

24. The tire according to claim 4 wherein said polysulfide is a bis-3-(triethoxysilylpropyl) polysulfide having an average of about 2 to about 5 connecting sulfur atoms in its sulfur bridge.

25. The tire according to claim 5 wherein said polysulfide is a bis-3-(triethoxysilylpropyl) polysulfide having an average of about 2 to about 5 connecting sulfur atoms in its sulfur bridge.

26. The tire according to claim 6 wherein said polysulfide is a bis-3-(triethoxysilylpropyl) polysulfide having an average of about 2 to about 5 connecting sulfur atoms in its sulfur bridge.

27. The tire according to claim 7 wherein said polysulfide is a bis-3-(triethoxysilylpropyl) polysulfide having an average of about 2 to about 5 connecting sulfur atoms in its sulfur bridge.

28. The tire according to claim 8 wherein said polysulfide is a bis-3-(triethoxysilylpropyl) polysulfide having an average of about 2 to about 5 connecting sulfur atoms in its sulfur bridge.

29. The tire according to claim 9 wherein said polysulfide is a bis-3-(triethoxysilylpropyl) polysulfide having an average of about 2 to about 5 connecting sulfur atoms in its sulfur bridge.

30. The tire according to claim 10 wherein said polysulfide is a bis-3-(triethoxysilylpropyl) polysulfide having an average of about 2 to about 5 connecting sulfur atoms in its sulfur bridge.

31. The tire according to claim 11 wherein said polysulfide is a bis-3-(triethoxysilylpropyl) polysulfide having an average of about 2 to about 5 connecting sulfur atoms in its sulfur bridge.

32. The tire according to claim 12 wherein said polysulfide is a bis-3-(triethoxysilylpropyl) polysulfide having an average of about 2 to about 5 connecting sulfur atoms in its sulfur bridge.

33. The tire according to claim 13 wherein said polysulfide is a bis-3-(triethoxysilylpropyl) polysulfide having an average of about 2 to about 5 connecting sulfur atoms in its sulfur bridge.

34. The tire according to claim 14 wherein said polysulfide is a bis-3-(triethoxysilylpropyl) polysulfide having an average of about 2 to about 5 connecting sulfur atoms in its sulfur bridge.

35. The tire according to claim 15 wherein said polysulfide is a bis-3-(triethoxysilylpropyl) polysulfide having an average of about 2 to about 5 connecting sulfur atoms in its sulfur bridge.

36. The tire according to claim 16 wherein said polysulfide is a bis-3-(triethoxysilylpropyl) polysulfide having an average of about 2 to about 5 connecting sulfur atoms in its sulfur bridge.

* * * * *